(12) United States Patent
Sanderson

(10) Patent No.: US 6,517,241 B1
(45) Date of Patent: Feb. 11, 2003

(54) SENSORS AND METHODOLOGY FOR IMPROVED TURBINE EXHAUST GAS TEMPERATURE MEASUREMENTS

(75) Inventor: Simon Ralph Sanderson, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/579,231

(22) Filed: May 30, 2000

(51) Int. Cl.[7] .............................. G01K 7/02; G01K 7/16; G01K 13/00
(52) U.S. Cl. ..................... 374/179; 374/185; 374/144
(58) Field of Search ........................ 374/1, 166, 144, 374/179, 185, 183; 702/22, 23, 24, 27, 30, 31, 32, 33, 75, 76, 77, 106, 113, 115, 130, 132, 133, 134, 135, 136, 182, 183, 184, 185, 188, 189, 190; 700/287

(56) References Cited

U.S. PATENT DOCUMENTS

| | | | |
|---|---|---|---|
| 2,698,872 A | | 8/1951 | Broffitt |
| 4,186,605 A | * | 2/1980 | Bourigault .................. 374/166 |
| 4,554,633 A | * | 11/1985 | Glover et al. ............... 702/190 |
| 4,614,907 A | * | 9/1986 | Nagayama ................... 702/190 |
| 5,106,203 A | * | 4/1992 | Napoli et al. ............... 374/179 |
| 5,449,234 A | * | 9/1995 | Gipp et al. .................. 374/185 |
| 5,636,126 A | * | 6/1997 | Heaven et al. .............. 702/190 |
| 6,222,111 B1 | * | 4/2001 | Kern .......................... 374/179 |

FOREIGN PATENT DOCUMENTS

| EP | 869375 A2 | 7/1998 |
|---|---|---|
| EP | 989393 A2 | 3/2000 |

* cited by examiner

*Primary Examiner*—Diego Gutierrez
*Assistant Examiner*—Madeline Gonzalez
(74) *Attorney, Agent, or Firm*—Patrick K. Patnode; Christian G. Cabou

(57) ABSTRACT

A method for characterizing the parameters of a normally occurring turbine exhaust gas temperature profile is provided. From that characterization the characteristics of a filter function to eliminate or significantly reduce the strength of aliased signals from that normally occurring pattern are established. Sensors to provide filtering functions for that purpose include a distributed gradient thermocouple system and a resistance thermometer system. Examples of such sensor systems are disclosed. The method and related sensors improve the detection limits associated with exhaust gas temperature profiles used to monitor, diagnose, and control gas turbines.

6 Claims, 3 Drawing Sheets

SENSORS AND METHODOLOGY FOR IMPROVED TURBINE EXHAUST GAS TEMPERATURE MEASUREMENTS

BACKGROUND OF THE INVENTION

This invention relates generally to systems for measuring turbine exhaust gas temperatures and more particularly to a method and sensors for accurately measuring deviations in the exhaust gas temperature profile of a turbine.

Turbines, including gas, steam and other forms of turbomachinery, include a stator structure and a rotor structure. The stator is a fixed structure around which the rotor rotates. The stator and rotor each generally includes one or more sets of blades offset from one another and extending into an annular flow path between the stator and the rotor. In a gas turbine, for example, a set of stator compressor blades and a set of rotor compressor blades act together to compress air entering the flow path. Fuel is injected into the flow path beyond the compressor blades. Mixing nozzles in the flow path act to mix the fuel and compressed air in a premixing stage. That mixture is then ignited in a combustor stage. The product of combustion is an expanded gas that passes through the flow path of the turbine to contact a set of stator turbine blades and a set of rotor turbine blades. The expanded gas moving in the flow path acts to move the rotor turbine blades, causing their rotation. Spent combustion products exit the turbine as exhaust gas directed to the atmosphere by an exhaust duct.

An important operating and control parameter associated with efficient turbine operation is the temperature of the exhaust gas. Typically, the exhaust gas is measured using a plurality of thermocouples spaced equidistant around the circumference of the exhaust duct. The mean exhaust temperature calculated from the retrieved thermocouple measurements is used to monitor and control turbine operation. In addition, deviations in temperature readings between individual thermocouples are monitored for undesirable operating conditions and events. Relatively small deviations may be evidence of operating inefficiencies placing uneven stress in localized areas of the turbine, thereby reducing service life of one or more components. Large temperature deviations may be evidence of serious abnormalities requiring immediate attention.

Statistical evidence gathered from thermocouple outputs over many hours of turbine operation has generally been used to establish failure trends. It has been determined that such statistical trending has been a useful diagnostic tool for incipient failure detection. Measured temperature deviations have been used to detect anomalies including, but not limited to, fuel nozzle defects, combustor stage liner cracking, turbine flame out, fuel/air premixing flashback, and/or structural leakage. All such anomalies influence the rates at which fuel and/or air are introduced into the turbine and so their detection is of great importance.

Difficulties arise in such monitoring and diagnostic techniques resulting from a masking of the abnormalities that the thermocouples are designed to detect. Specifically, the thermocouples are ordinarily laid out circumferentially around the exhaust duct in pre-determined patterns defined by the number, location, and spacing of the combustor elements and the stator and rotor blades. These difficulties can often be traced to a phenomenon known as aliasing. In general terms, aliasing occurs when sampling intervals are insufficient to distinguish between events taking place at different frequencies. That is, a sampling rate may be sufficient to detect events at one frequency but insufficient to detect events occurring at a higher frequency. Of greater concern, normal high frequency events may appear as low frequency signals, thereby masking anomalous low-frequency events.

In the context of a turbine exhaust duct, aliasing occurs when normally occurring exhaust temperature patterns include high-frequency signals that appear as low-frequency signals. The limit at which this occurs is a function of the number of discrete thermocouples deployed about the turbine exhaust duct. That is, the number of thermocouples in the array on the duct is insufficient to resolve all of the spatial frequencies present in the exhaust pattern established by the noted turbine components. The high spatial frequency content of the exhaust pattern is therefore incorrectly represented (aliased) as lower spatial frequency content. The aliased signal is an ambiguous one potentially representing two or more spatial frequency patterns including anomalies that may be of interest. Significant anomalies may therefore go undetected. One solution would be to deploy many more thermocouples. Such a solution is not practical, however.

The aliasing phenomenon is well known in the signal-processing field, less so in the field of turbomachinery. Nevertheless, the problem can clearly be seen through several simple equations for N number of thermocouples spaced equidistant from one another about the perimeter of an exhaust duct. The location of that thermocouple, n, with respect to the center of the exhaust duct is defined by the azimuthal angle $\theta_n$ in the relationship set out in Equation (1):

$$\theta_n = 2\pi n/N \qquad \text{Eq. (1)}$$

For what is effectively a periodic sampling of a sinusoidal signal, the signal to be analyzed, identified generally by the function $x(\theta)$, can be resolved and simplified into generic Equation (2), in which the amplitude of the signal is A, and k is its spatial frequency:

$$x(\theta) = A \cos(k\theta) \qquad \text{Eq. (2)}$$

When sampled at each of the N discrete locations the result is;

$$x(n) = A \cos(2\pi k n/N) \qquad \text{Eq. (3)}$$

For two such spatially periodic components of differing frequencies, $k_1$ and $k_2$, and described by the functions $x_1(\theta)$ and $x_2(\theta)$, we get the two sets of sampled measurements $x_1(n)$ and $x_2(n)$, where:

$$x_1(n) = A \cos(2\pi k_1 n/N) \qquad \text{Eq. (4)}$$

and $$x_2(n) = A \cos(2\pi k_2 n/N) \qquad \text{Eq. (5)}$$

when each of the differing signals is sampled at identical locations on the exhaust duct. It can be shown by substitution that the two sets of sampled measurements, $x_1(n)$ and $x_2(n)$, are identical when the relationship $$k_1 - k_2 = mN \qquad \text{Eq. (6)}$$

is satisfied for some m=..., −2, −1, 0, 1, 2, ..., etc. (i.e., any integer). In this circumstance, the two signals are indistinguishable when observed via the array of N thermocouples.

An example illustrates this point. In a gas turbine having 14 combustor cans and 27 thermocouples spaced about the exhaust duct, the exhaust pattern will contain features indicating the presence of the 14 combustor cans. However, since the sampling spread is not adequate, the features will not be accurately represented. The spatial frequencies of the fundamental (14 per revolution) and harmonics (28, 42, ... , per revolution) exceed the Nyquist limit of 27/2=13.5 beyond which the signal cannot be uniquely represented. For the fundamental with $k_1=14$ we have from Equation (6) $k_2=-13$ with m=1. That is, the signal from the 14 combustor cans is aliased in the observable range ±13.5 per revolution, as a signal out of phase and with a spatial frequency of 13 per revolution. Interpretation of this aliased signal would be confusing.

For the first harmonic we have from Equation (6) $k_1=28$ and $k_2=1$ for m=1. That is, the signal is observed as one with a spatial frequency of 1 per revolution. This signal would likely be sufficiently strong to obscure any real discrete defect about the turbine annulus that would also be characterized by a fundamental spatial frequency of 1 per revolution.

It can be seen that signal aliasing will occur using conventional discrete thermocouple systems. As a result, significant events such as thermal distortions and the like may be masked by normal exhaust temperature patterns and remain undetected by the thermocouples of the exhaust duct. Accordingly, there is a need for a technique to describe the exhaust gas temperature profile and deviations associated therewith. That technique can be used to identify normal pattern spatial frequencies that may mask anomalies that should be detected. There is thus a need for a mechanism to eliminate or minimize the aliasing of the spatial frequencies of the normal temperature pattern. There is also a need for a sensing arrangement that resolves aliasing and thereby provides an accurate temperature profile in regard to the entirety of the turbine structure.

SUMMARY OF THE INVENTION

The above-mentioned needs are met by the present invention, which provides a methodology and set of sensor types suitable for improved turbine exhaust gas temperature measurements. The method includes limiting the bandwidth of the spectral character of an exhaust gas temperature profile of a turbine having an exhaust gas duct. It includes the steps of first determining the spatial frequencies of a gas turbine exhaust temperature pattern and then establishing a spatial frequency limit. The method further includes the step of defining a filter function to filter out those of the spatial frequencies greater than the spatial frequency limit and then applying to the turbine exhaust duct a temperature sensor system that generates the filter function.

The sensor arrangement to achieve improved exhaust gas measurements provides the appropriate filter function. One such arrangement is a sensor with a plurality of distributed gradient thermocouples affixable to the turbine exhaust duct, wherein each of the distributed gradient thermocouples is formed of two or more materials of differing thermoelectric coefficients, and wherein the sensor defines a filter function for filtering out aliased signals of a standard exhaust gas temperature pattern.

The present invention and its advantages over the prior art will become apparent upon reading the following detailed description and the appended claims with reference to the accompanying drawings.

DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
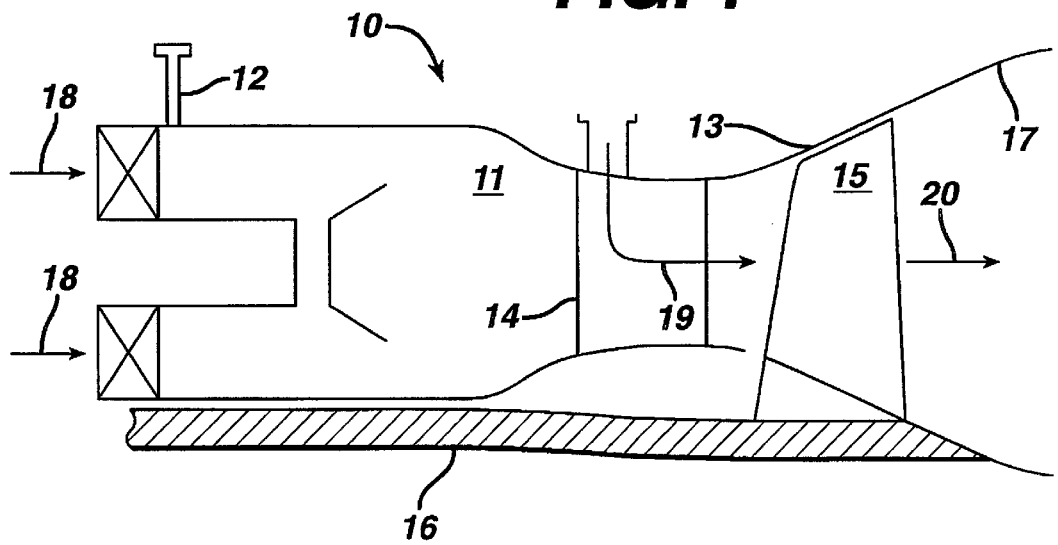
FIG. 1 is a simplified cross-sectional view of the hot gas path of a gas turbine.

Referring to the drawings wherein identical reference numerals denote the same elements throughout the various views, FIG. 1 presents a simple view of a portion of a turbine engine 10. Among other things, the turbine engine 10 includes a compressor (not shown) that provides pressurized air to a combustor section 11 where the pressurized air is mixed with fuel from fuel inlet 12 and ignited for generating hot combustion gases. These gases flow downstream to a turbine 13, along with cooling air from a plurality of circumferentially spaced turbine stator nozzles 14. The turbine 13 includes a plurality of circumferentially spaced apart blades, including exemplar turbine blade 15, extending radially outwardly from a wheel that is fastened to a shaft 16 for rotation about the centerline axis of the turbine engine 10. The hot combustion gases expand against the turbine blade 15 causing the wheel to rotate as they pass to an exhaust duct 17. This gas expansion in turn rotates the shaft 16 that is connected to the compressor and may also be connected to load equipment such as an electric generator or a propeller.

Of course, depending upon the specific dimensions and duties of the turbine engine 10, there may be a plurality of the various components shown. For the purpose of the description of the spectral analysis technique of the present invention, certain aspects of the operation of the turbine engine will be given detailed attention. Specifically, the components of fluid flow through the turbine engine 10, including combustor flow 18, cooling air flow 19, and exhaust flow 20, will be considered in this example analysis.

Using conventional mass conservation and isenthalpic mixing equations, each stream tube associated with the turbine engine 10 can be represented in simple one-dimensional terms, assuming mass is conserved along that pathway, by the following two equations:

$$m_{exhaust}(\ominus)=m_{combustor}(\ominus)+m_{cool}(\ominus)=m_{turbine}(\ominus) \quad \text{Eq. (7)}$$

$$m_{turbine\ inlet}(\ominus)h_{turbine\ inlet}(\ominus)=m_{combustor}(\ominus)h_{combustor}(\ominus)+m_{cool}(\eta)h_{cool}(\ominus) \quad \text{Eq. (8)}$$

where mass flows are per unit time and unit area of annular flowpath through the turbine 10. $\ominus$ is the azimuthal angle around the turbine 10, $h_{combustor}(\ominus)$ is the enthalpy of the exit pattern from the combustor 11, $m_{cool}(\ominus)$ is the periodic cooling flow from stator blades of the turbine 10, and $h_{cool}$ is the enthalpy of discharge coolant from the compressor 12. It is to be noted that $h_{combustor}(\ominus)$ can be resolved into its components by the simple equation $$h_{combustor}(73) = h_{combustor} + \Delta h_{combustor}(\ominus) \quad \text{Eq. (9)}$$

where $h_{combustor}$ is the spatial mean combustor exhaust enthalpy and $\Delta h_{combustor}(\ominus)$ describes the spatial enthalpy variations caused by combustor features including, but not limited to, such features as can, swirlers, and the like.

It is known that the polytropic flow pattern through the turbine engine 10 is caused by the plurality of various components within the flow pathway. The enthalpy associated with that flow may be characterized by Equation (10), in which p is the pressure associated with the particular flow component identified by subscript:

$$h_{exhaust}(\ominus) = h_{turbine\ inlet}(\ominus) * (p_{exhaust}/p_{combustor})^{\gamma - 1/\gamma} \quad \text{Eq. (10)}$$

For the purpose of the present invention, the solution for $h_{exhaust}(\ominus)$ is of interest in resolving the spatial spectrum of the exhaust temperature pattern. By combining and manipulating Equations (8) and (9) and assuming $m_{cool}(\ominus)/m_{combustor}$ is much less than unity, it can be determined that $$h_{turbine}(\ominus)/h_{combustor} = 1 + \Delta h_{combustor}(\ominus)/h_{combustor} - (h_{combustor} - h_{cool})/h_{combustor} *$$
$$m_{cool}(\ominus)/m_{combustor} - m_{cool}(\ominus) \Delta h_{combustor}(\ominus)/m_{combustor} h_{combustor} + \text{higher order terms} \quad \text{Eq. (11)}$$

Thermal pattern and cooling variations can then be characterized pursuant to the functions $f_{cool}(\ominus)$ and $f_{pattern}(\ominus)$, where $f_{cool}(\ominus)$ defines the spatial variation caused by nozzle cooling and unit amplitude of that flow. That is, the spatial frequency associated with the number of cooling nozzles, their spacing, and the like. The function $f_{pattern}(\ominus)$ defines the spatial variation caused by combustor flow and unit amplitude of that flow. That is, the spatial frequency associated with the number of combustor cans, their spacing, and the like. Using these general functions to characterize the circumferential variations in the gas flows, it can be seen that, $$m_{cool}(\ominus)/m_{combustor} = (m_{cool}/m_{combustor})(1 + f_{cool}(\ominus)) \quad \text{Eq. (12)}$$

and $$\Delta h_{combustor}(\ominus)/h_{combustor} = (\Delta h_{combustor}/h_{combustor}) f_{pattern}(\ominus) \quad \text{Eq. (13)}$$

Taking into account Equations (10) to (13), Equation (14) that follows represents a model of the present invention for the turbine exhaust gas temperature profile:

$$h_{exhaust}(\ominus) = (p_{exhaust}/p_{combustor})^{\gamma - 1/\gamma} [1 - ((h_{combustor} - h_{cool})/h_{combustor})(m_{cool}/m_{combustor}) + (1 - m_{cool}/m_{combustor})(\Delta h_{combustor}/h_{combustor}) f_{pattern}(\ominus) - ((h_{combustor} - h_{cool})/h_{combustor})(m_{cool}/m_{combustor}) f_{cool}(\ominus) -$$

$$m_{cool}/m_{combustor})(\Delta h_{combustor}/h_{combustor}) f_{cool}(\ominus) f_{pattern}(\ominus) + \text{high order term}] \quad \text{Eq. (14)}$$

Equation (14) provides a set of terms correlating to the components of the turbine engine 10 that affect the temperature pattern of the exhaust flow 20 out of the turbine exhaust duct 17. Table 1 summarizes the terms of Equation (14) and the turbine components that define specific spatial frequencies of the exhaust duct thermal pattern.

TABLE 1

| Term | Order | Spatial Frequencies |
|---|---|---|
| 1 | 1 | 0 |
| $(h_{combustor} - h_{cool})/h_{combustor}$ | $m_{cool}/m_{combustor}$ | 0 |
| $(1 - m_{cool}/m_{combustor}) * f_{pattern}$ | $\Delta h_{combustor}/h_{combustor}$ | $n_{cans}, 2n_{cans}, 3n_{cans}, \ldots$ |
| $((h_{combustor} - h_{cool})/h_{combustor}) * f_{cool}$ | $m_{cool}/m_{combustor}$ | $n_{nozzles}, 2n_{nozzles}, 3n_{nozzles}, \ldots$ |
| $f_{cool} f_{pattern}$ | $m_{cool} \Delta h_{combustor}/$ | $n_{nozzles} \pm n_{cans}, n_{nozzles} \pm$ |
|  | $m_{combustor} h_{combustor}$ | $2n_{cans}, n_{nozzles} \pm 3n_{cans}, \ldots$ |

Figure 4:
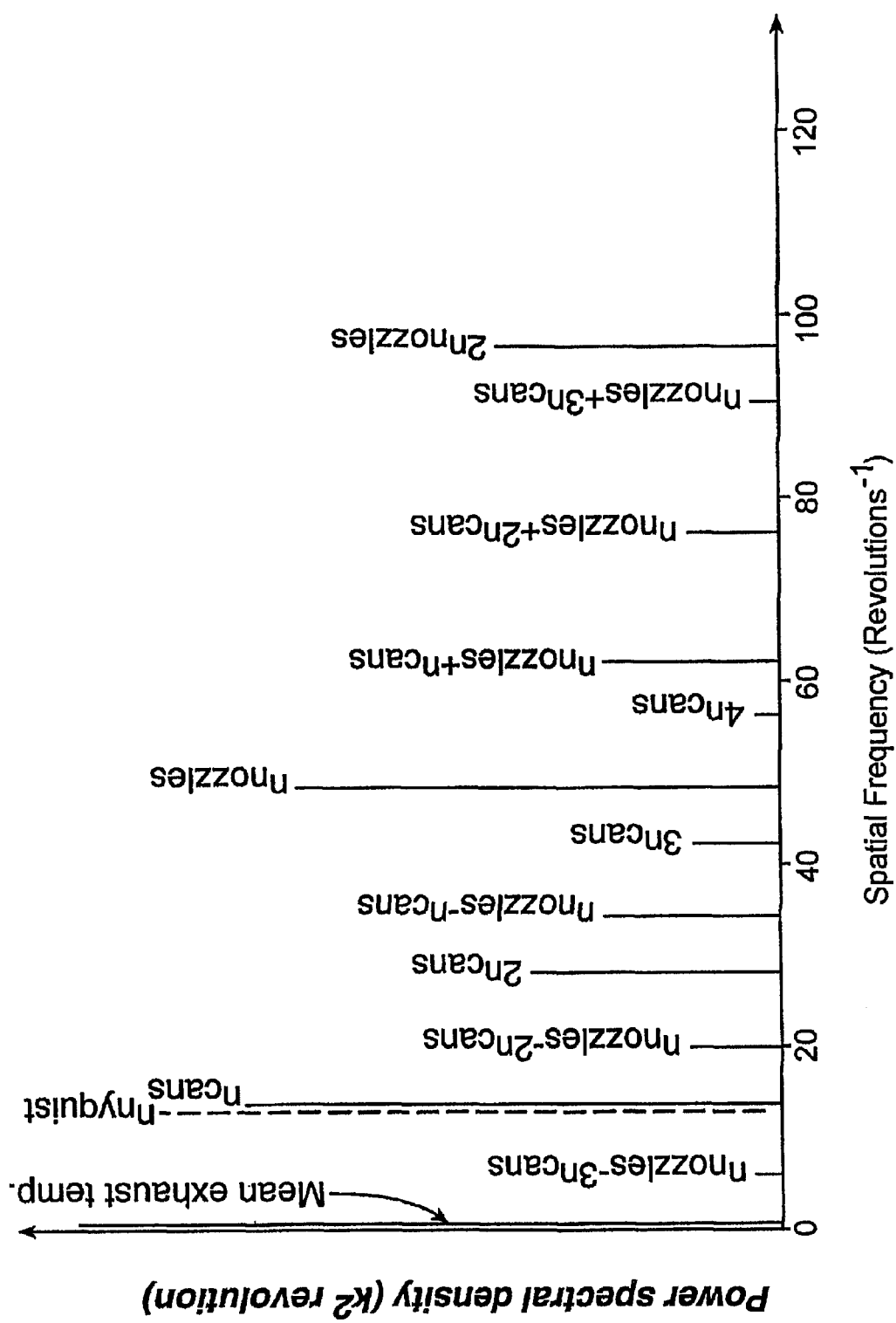
FIG. 4 is a graph of the spectral power density of the fundamental and harmonic thermal frequencies as measured using the discrete thermocouples.

The first term in table 1 is associated with the mean combustor exhaust temperature. The second term is associated with the mean cooling effect of the airflow from the stator nozzles. The third term is the amplitude of the spectral temperature signal with respect to the spatial frequency associated with the flow from the combustor cans relative to the centerline of the turbine, and its higher harmonics. The fourth term is the amplitude of the spectral temperature signal with respect to the spatial frequency associated with flow from the stator nozzles relative to the centerline of the turbine, and its higher harmonics. The final term represents side bands that result from the non-linearity produced by the mixing of the fluid flow streams from the combustor cans and the nozzles. The spectrum is illustrated in FIG. 4 for a machine with 14 combustor cans and 48 nozzles. With 27 thermocouples, all high frequency content above the Nyquist limit of 13.5 is aliased and greatly confuses interpretation of the measured spectrum.

The method developed in the present invention to characterize the spectral frequency as a function of the effects of the combustor cans, the cooling nozzles, and their associated components, can be used to identify effective temperature sensors. Specifically, a distributed gradient thermocouple system 30 of the present invention is shown in simplified form in FIG. 2. The system 30 includes a plurality of spaced gradient thermocouples 31 having coupling leads 32 for transmission of an electrical signal to analysis equipment (not shown). The thermocouples 31 are preferably spaced about the turbine exhaust duct 17 in a manner similar to that used in the prior discrete thermocouple arrangement. It is to be noted that the gradient thermocouples 31 may be separated from one another around the perimeter of the exhaust duct 17 or they may overlap in one or more locations, in accordance with the desired filter function. The number of thermocouples 31 used is dependent upon the particular turbine characteristics and specifically spatial frequencies to be detected. Further, the gradient thermocouple system 30 is one among other options to address the aliasing problem. Another is a resistance thermometer to be described.

Figure 3:
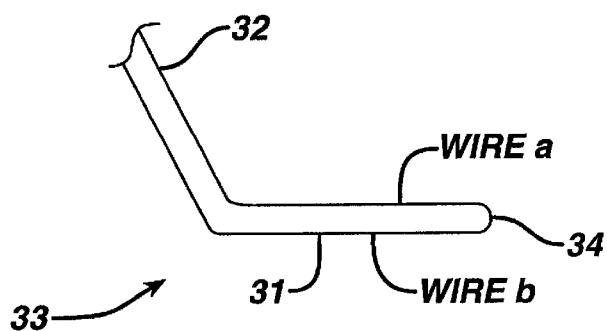
FIG. 3 is a simplified representation of a gradient thermocouple of the present invention.

An important aspect of the distributed gradient thermocouple system 30 of the present invention is the make-up of the gradient thermocouples 31 shown in FIG. 3. They are formed as composites of materials having differing thermoelectric coefficients. Each of the gradient thermocouples 31 is formed of a mixture of two or more such materials. Further, each is formed with a varying ratio of the mixture of materials along the length of the thermocouple 31. That is, for example, material "A" may be the composition of one of the coupling leads 32. The end 33 of the thermocouple wire that joins to it is 100% material A. The second coupling 32 is formed of material B and the end of the other thermocouple wire joined to it is 100% material B. Along the thermocouple wire towards end 34, the first thermocouple wire has gradually increasing amounts of material B added to the base material A and the second thermocouple wire has gradually increasing amounts of material A added to the base material B. At end 34, both thermocouple wires are arranged to have identical compositions, nominally 50% each of materials A and B. Of course, a variety of materials of different thermoelectric coefficients may be employed in a variety of ratios to provide thermocouples 31 with selectable outputs producing the desired filter function along the thermocouple length. Standard thermocouple materials with appropriate continuously variable solubility in each other, such that a smooth variation of thermoelectric coefficient is obtained, are to be employed.

This arrangement of materials of differing thermoelectric coefficients provides a sensor with the desired characteristics. Differential temperature changes along the length of each gradient thermocouple 31 produce differential contributions to the electromotive force, $E_{AB}$, sensed at the junction with leads 32. The differential contributions, $dE_{AB}$, for the example of two materials A and B, is proportional to the difference between the thermoelectric coefficients for each of the materials at the composition of materials existing at that point along the thermocouple wire. This can be characterized by Equation (15), in which "α" is the local thermoelectric coefficient of the material, "x" is a specific location along the length of the thermocouple, "L" is the length of the gradient thermocouple, "T" is the local temperature, and subscripts "a" and "b" refer to the two thermocouple wires:

$$E_{AB} = \int [\alpha_a(x) - \alpha_b(x)](dT(x)/dx)dx \qquad \text{Eq. (15)}$$

Assume for purposes of one example that there is a gradient in material composition between ends 33 and 34 so that the following gradient in differential thermoelectric coefficient is produced:

$$\alpha_a(x) - \alpha_b(x) = (\alpha_a(0) - \alpha_b(0))(1 - x/L) \qquad \text{Eq. (16)}$$

Since the thermocouple wires are 100% materials A and B at end 33 where x=0, we have $\alpha_a(0)=\alpha_A$ and $\alpha_b(0)=\alpha_B$ or, $\alpha_a(x) - \alpha_b(x) = \Delta\alpha_{AB}(1-x/L)$, where $\Delta\alpha_{AB} = \alpha_A - \alpha_B$. Substituting Equation (16) into Equation (15) and expanding by parts results in Equation (17):

$$E_{AB} = \Delta\alpha_{AB} * (1/L) \int T(x) - T(0) dx \qquad \text{Eq. (17)}$$

Equation (17) clearly indicates that each of the gradient thermocouples 31 responds to the spatially averaged temperature differential experienced along its entire length L. It is to be noted that extension wires 32 and/or cold junctions may be added to the thermocouples 31 to produce average temperature values in relation to a cold junction temperature, if one is to be measured.

The array of gradient thermocouples 31 of the system 30 provides a filtering system that acts to suppress the amplitude of higher frequency signals associated with the harmonics of the turbine's standard components. This may be understood as follows. Consider a gas turbine exhaust temperature pattern described by the $2\pi$ periodic function $T(\ominus)$; $T(\ominus) = T(\ominus + 2\pi)$, where $\ominus$ is the azimuthal angle around the turbine. An exhaust pattern sensor having a spatial filter function $F(\ominus)$ yields a measured temperature $M(\ominus)$. $T(\ominus)$, $F(\ominus)$, and $M(\ominus)$ are related to one another through the convolution $M(\ominus) = \int F(\ominus - \phi) T(\phi) d\phi$. Invoking the convolution property of the Fourier transform, $M(n) = F(n)T(n)$, where n is the spatial frequency and M, F, and T are Fourier transforms of M, F, and T, respectively.

Figure 2:
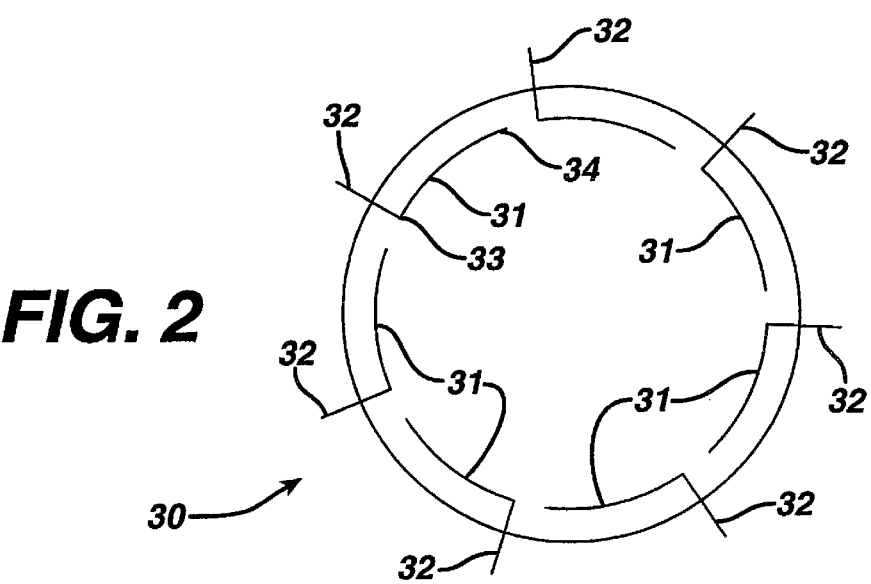
FIG. 2 is a simplified end view of a turbine exhaust duct of having the thermocouple gradient set of the present invention coupled thereto.

For the gradient thermocouple of the present invention as shown in FIG. 2, whose action is expressed by Equation (17), the filter function is $F(\ominus)=0$ for $|\ominus|>\pi/n_{thermocouples}$, and $F(\ominus)=n_{thermocouples}/2\pi$ for $|\ominus| \leq \pi/n_{thermocouples}$. The standard Fourier transform for the filter function associated with the distributed gradient thermocouple system of the present invention is presented in Equation (18) in which n is the spatial frequency, revolutions$^{-1}$:

$$F(n) = n_{thermocouples}/\pi n * \sin(\pi n/n_{thermocouples}) \qquad \text{Eq. (18)}$$

Figure 5:
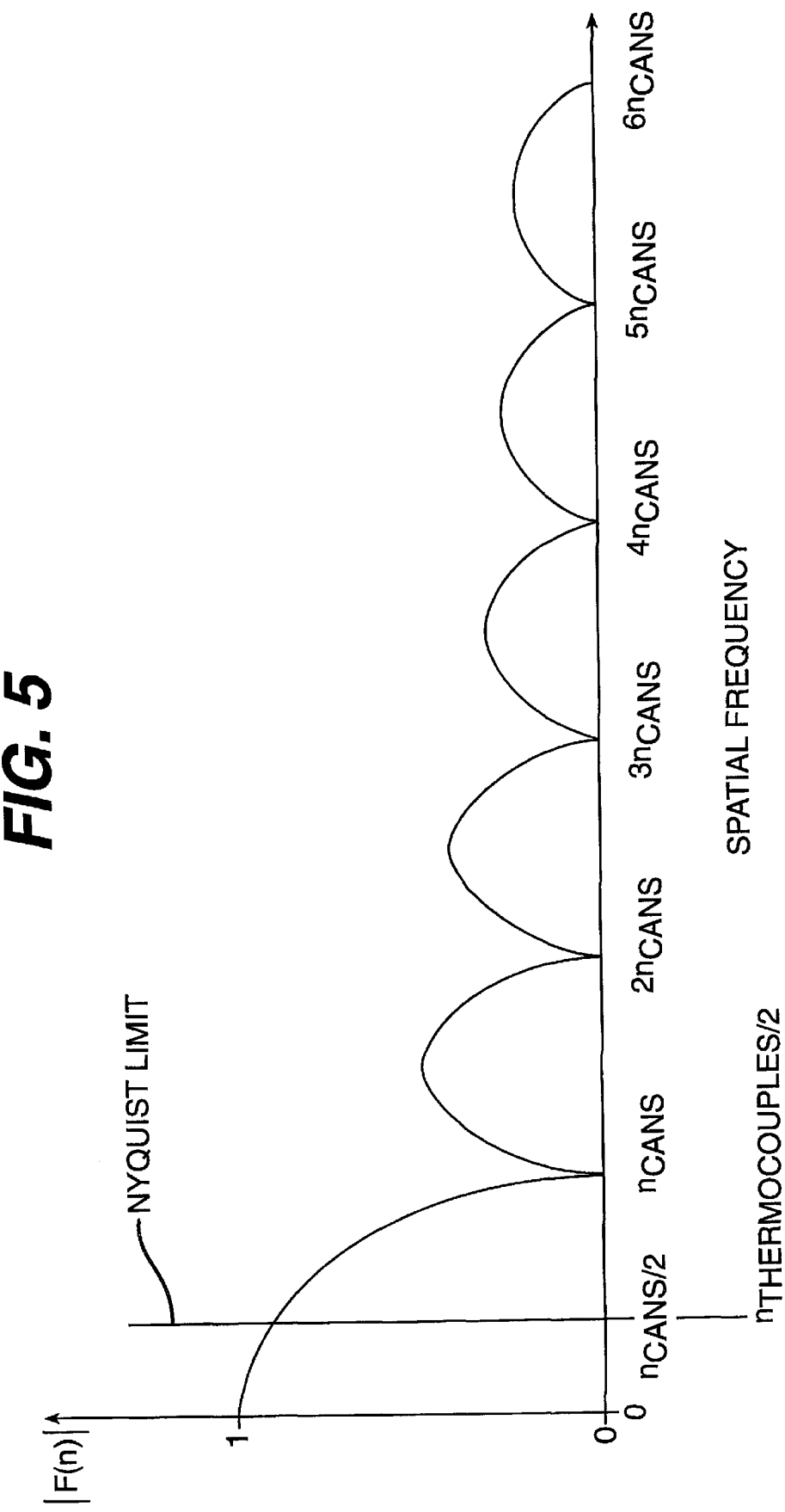
FIG. 5 is a graph of an exemplar amplitude response of the filter function associated with the thermocouple gradient of the present invention in relation to spatial response frequency.

Satisfactory results are obtained in the case when $n_{thermocouples}$ is chosen to equal the number of combustor cans. Note that this is a significantly smaller number of thermocouples then in the existing art discussed. The resulting filter spectrum is shown in FIG. 5. Note that the Nyquist limit is now $n_{thermocouples}/2$. Observe that from Equation (18) and from FIG. 5 that the dominant signals, the fundamental and harmonics of the combustor can spectrum, are totally rejected in this arrangement. The remaining high frequency content associated with the cooled nozzles is significantly reduced in amplitude. For example, for a turbine 10 with 48 nozzles, 14 combustor cans, and 14 thermocouples 31, the signal amplitude of the typical pattern is reduced by a factor of $|F(\eta=48)|=(14/48*\pi)*\sin(48*\pi/14)=0.09$. All of the expected high frequency content is therefore significantly attenuated and when aliased to frequencies below the Nyquist limit, it no longer obscures the low frequency signals produced by genuine, discrete combustor defects.

Alternative filter functions may be developed by those skilled in this field. The objective of the present invention is to provide a method and at least one proposed system for recognizing the spectral patterns associated with typical turbine structures and providing a filter mechanism for masking high frequency fundamental and harmonic that can otherwise mask defects to be detected and to do so without significantly increasing the number of measuring devices. The gradient thermocouple system 30 of FIG. 2 is one such system. Manipulation of the ratios of the differing materials and their associated thermoelectric coefficients may be used to tailor specific filter characteristics of the gradient thermocouple system 30.

An alternative effective filter function may be provided using a resistance thermometer. A resistance thermometer system may be deployed around the turbine exhaust duct 17 in the same manner as described for the gradient thermocouple system 30 shown in FIG. 2. Instead of being formed of two or more materials of differing thermoelectric coefficients, each resistance thermometer of the system is a wire or a wound wire package. The resistance thermometer has a resistivity $\rho$ at any one point x along its length L between a first end A and a second end B that is dependent upon the temperature according to $\rho(x) = \rho_0 + \beta(T(x) - T_0)$, where $\rho_0$ is the resistivity at reference temperature $T_0$ and $\beta$ is the temperature coefficient of the resistivity. Equation (19) describes the resistance across the resistance thermometer of constant cross sectional area A. As a result, the resistance thermometer provides an alternative filter function that markedly reduces the strength of the turbine's typical spectral pattern.

$$R_{AB}=\rho_0(L/A)+(\beta/A)*\int T(x)-T_0 dx \qquad \text{Eq. (19)}$$

More complex filter functions may be obtained by manipulation of cross sectional area and other features of the resistance thermometer.

The foregoing has described a method for characterizing the spectral pattern of a turbine exhaust duct temperature. Additionally, it has described two sensor types each designed to introduce a filter function into the temperature measurement analysis to limit the spectral frequency bandwidth. In that way, relatively small-scale structural anomalies observable from deviations in the turbine exhaust gas temperature profile will not be masked by aliased signals associated with normally occurring exhaust gas temperature patterns. While specific embodiments of the present invention have been described, it will be apparent to those skilled in the art that various modifications thereto can be made without departing from the spirit and scope of the invention as defined in the appended claims.

What is claimed is:

1. A method of limiting the bandwidth of the spectral character of an exhaust gas temperature profile of a turbine having an exhaust gas duct, the method comprising the steps of:

determining spatial frequencies of a gas turbine exhaust temperature pattern having an arbitrary unknown profile;

establishing a spatial frequency limit;

defining a filter function to filter out those of said spatial frequencies greater than said spatial frequency limit; and applying to the turbine exhaust duct a reduced set of distributed sensors in a temperature sensor system that generates said filter function using variations of the physical characteristics of said distributed sensors along the length of a respective sensor.

2. The method of claim 1 wherein the turbine includes one or more combustors and one or more cooling nozzles, and wherein said step of determining spatial frequencies includes the steps of:

determining a spatial frequency variation associated with operation of the one or more combustors; and determining a spatial frequency variation associated with operation of the one or more cooling nozzles.

3. The method of claim 1 wherein said temperature sensor system includes a plurality of sensors spaced equidistant about the turbine exhaust duct.

4. The method of claim 3 wherein the step of establishing a spatial frequency limit includes the steps of:

identifying the number of said sensors about the turbine exhaust duct;

dividing the number of said sensors by two to establish a Nyquist limit number; and defining said spatial frequency limit as a frequency less than said Nyquist limit number.

5. The method of claim 3 wherein each of said plurality of sensors is a distributed gradient thermocouple.

6. The method of claim 3 wherein each of said plurality of sensors is a resistance thermometer.

* * * * *